United States Patent
Bilac et al.

(10) Patent No.: US 6,356,422 B1
(45) Date of Patent: Mar. 12, 2002

(54) CIRCUIT BREAKER COMMUNICATION AND CONTROL SYSTEM

(75) Inventors: Mario Bilac, Lawrenceville, GA (US); Paul J. Terricciano, Wake Forest, NC (US); William Petrosky, Alpharetta, GA (US); Charles Randall Dollar, II, Norcross, GA (US); Mikhail B. Golod, Alpharetta, GA (US); Euclid Batista, Marietta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,348

(22) Filed: Nov. 5, 1999

(51) Int. Cl.[7] .............................. H02H 3/08; H02H 9/02
(52) U.S. Cl. ..................... 361/93.1; 361/64; 361/68; 361/102; 361/115; 361/119
(58) Field of Search .................. 361/93.1, 64, 91.1, 361/102, 111, 115, 119, 68; 700/292, 293, 295

(56) References Cited

U.S. PATENT DOCUMENTS

| | | |
|---|---|---|
| 4,631,625 A | 12/1986 | Alexander et al. |
| 4,751,605 A | 6/1988 | Mertz et al. |
| 4,870,531 A | 9/1989 | Danek |
| 4,947,126 A | 8/1990 | May et al. |
| 5,239,144 A | 8/1993 | Robbins et al. |
| 5,381,119 A | 1/1995 | Robbins et al. |
| 5,426,592 A | 6/1995 | Leone et al. |
| 5,617,286 A | 4/1997 | Jenkins |
| 5,740,027 A | 4/1998 | Akers et al. |
| 5,754,386 A | 5/1998 | Barbour et al. |
| 5,907,467 A | 5/1999 | Barbour |
| 5,940,257 A | 8/1999 | Zavis |
| 5,982,596 A | * 11/1999 | Spencer et al. ............. 361/64 |
| 6,195,591 B1 | * 2/2001 | Nixon et al. ............. 700/83 |

* cited by examiner

Primary Examiner—Josie Ballato
Assistant Examiner—Vaughn Marquis
(74) Attorney, Agent, or Firm—Foley & Lardner

(57) ABSTRACT

A circuit breaker system 10 (FIG. 1) using electronic trip units 35 is disclosed. The electronic trip units 35 are coupled to a communications bus 30 whereby the electronic trip units 35 can be reconfigured, controlled, and/or monitored by a central computer 20. Further, the electronic trip units are coupled to a separate control power supply line 50 and to a zone selective interlock system.

21 Claims, 3 Drawing Sheets

CIRCUIT BREAKER COMMUNICATION AND CONTROL SYSTEM

FIELD OF THE INVENTION

The present invention relates generally to electric powered trip units, such as circuit breakers and more particularly to a communication and control system that cooperates with the electronic trip units.

BACKGROUND OF THE INVENTION

In a typical factory-power distribution system, power is generated by a power generation company and supplied to a factory and thereafter distributed around the factory to various equipment such as, for example, motors, welding machinery, computers, heaters, lighting, and the like.

Power distribution systems of this type are typically centrally located in switch gear rooms or substations. From there, power is divided up into branches such that each branch supplies power to a portion of the factory and/or specified loads. Frequently, transformers are disposed throughout the factory to step down the supply voltage to that required by specific pieces of equipment or portions of the factory. Therefore, a factory-power distribution system typically has a number of transformers servicing various types of equipment in various areas. Inherent with this, is the high cost of the power-distribution equipment such as transformers, as well as the cost of the equipment to which power is being supplied. Therefore, it is quite common to provide protective devices such as circuit breakers or fuses in at least each branch so that not only may each piece of equipment be protected but any problems associated with one piece of equipment does not ripple to adjacent or interconnected pieces of equipment. Further, providing fuses or circuit breakers in each branch can help minimize down time since specific loads may be energized or de-energized without affecting other loads thereby creating increased efficiencies, lower operating and manufacturing costs and the like.

Typically, when circuit breakers are utilized, they are used to detect more than just large overcurrent conditions caused by short circuit faults. In addition, they frequently detect lower level long-time overcurrent conditions and excessive ground currents. The simplest form of circuit breakers are thermally tripped as a result of heating caused by overcurrent conditions and, in this regard, are basically mechanical in nature. These mechanical-type breakers are incorporated into almost all circuit breakers, regardless of whether or not additional advanced circuitry is provided since they are extremely reliable over a long life cycle and provide a default trip-type level of protection.

Some types of circuit breakers utilize electronic circuitry to monitor the level of current passing through the branch circuits and to trip the breaker when the current exceeds a pre-defined maximum value. Electronic circuit breakers are adjustable so as to fit a particular load or condition by the end user without designing or specifying different breakers. Breakers of this type typically include a microcontroller coupled to one or more current sensors. The microcontroller continuously monitors the digitized current values using a curve which defines permissible time frames in which both low-level and high-level overcurrent conditions may exist. If an overcurrent condition has maintained for longer than its permissible time frame, the breaker is tripped.

Microcontrolled breakers may also include the ability to calculate root mean square (RMS) current values. This is necessary in order to prevent erroneously tripping a circuit breaker when a non-linear load, such as a welding machine, is coupled to the branch that it is protecting. The reason for this is that nonlinear loads tend to produce harmonics in the current waveform. These harmonics tend to distort the current waveform, causing it to exhibit peak values which are augmented at the harmonic frequencies. When the microcontroller, which assumes that the current waveform is a sinusoidal current waveform, detects these peaks it may therefore trip the breaker even though the heating effect of the distorted waveform may not require that the circuit be broken.

Further, microcontrollers in some circuit breakers are used to monitor and control or account for other types of faults, such as over or under voltage conditions and phase loss or imbalances. Such microcontrollers operate solenoids which are operatively connected to the trip mechanism of the circuit breaker. Therefore, while the thermal overload (mechanical) portion of the breaker will operate the trip mechanism, the solenoid will operate at the instruction of the microcontroller (or sometimes also at the instruction of external signals) to allow the trip mechanism to trip the associated circuit breaker.

Further, as a result of the flexibility and breadth of protection that microcontrollers can provide when used in conjunction with circuit breakers, their use in circuit breakers is becoming more and more prevalent to the point of being standard. However, this presents another problem in that microcontrollers and the associated circuitry require power. Such power may be typically provided in one of three ways or a combination thereof and would utilized either batteries, externally-supplied power, or power provided by potential transformers. Most users provide one power supply having battery back-up, for supplying all of the controllers for the entire substation or switch gear closet.

Moreover, the monitoring of power characteristics is being demanded more and more frequently in load control equipment and particularly in Molded Case Circuit Breakers (MCCB) as is frequently found in use in industry. Such power components include, RMS and peak voltage, current and power, either by phase or in total and power factor related components. Utilities and industrial customers are increasingly interested in performing end-use load studies. These studies are typically in the form of collecting interval power data so as to monitor and control energy consumption. While this is often done at a main load center, due to the increased costs and problems associated with time of use power consumption, such monitoring is being done closer to the individual end-use loads (i.e., motors, etc.). In this fashion, industrial customers are given a financial incentive to curtail power consumption when the cost of power is high as well as being able to more carefully and cost-effectively manage their power consumption by knowing where in their plant significant amounts of energy are being used.

When power monitoring is to be done, a discrete energy transducer is installed on the equipment or circuit to be monitored. This transducer generates a digital pulse output via a mechanical or solid state relay with the frequency of the pulse output being proportional to the magnitude of the measured quantity. This digital pulse output is either hard wired or communicated via power line-carrier system to a discrete pulse data recording device where it is time stamped.

Because of the flexibility and configurability of microprocessor controlled circuit breakers and the large size and complexity of the industrial settings in which they are used, there is a need for a centralized system providing communications to and from the circuit breakers. Also, there is a need for a communication system providing reconfigurability of the circuit breakers from a centralized location. Further, there is a need for monitoring of circuit breakers at a centralized location. Further still, there is a need for a circuit breaker system that can communicate with a central system, the central system providing monitoring, communication and control functions from a central location to the circuit breaker system.

SUMMARY OF THE INVENTION

One embodiment of the invention relates to an information system. The information system includes a circuit breaker connectable to a load and having a current interrupting portion. The information system also includes a data processing unit and a communications bus configured to be coupled to the data processing unit. The information system further includes an electronic monitoring unit, configured to provide at least one of monitoring, control, and communications functions for the circuit breaker and the electronic monitoring unit in communication with the circuit breaker and with the communications bus.

Another embodiment of the present invention relates to a circuit breaker communications, monitoring, and control system. The circuit breaker communications, monitoring, and control system includes a central data processing unit and a communications bus coupled to the central data processing unit. The system also includes an application specific module coupled to the communications bus and a circuit breaker connectable to a load and having a current interrupting portion, and the circuit breaker coupled to the application specific module and communicating electronic signals with the application specific module.

Still another embodiment of the invention relates to a circuit breaker system configured for use in a commercial environment. The circuit breaker system includes a circuit breaker connectable to a load and having a current interrupting portion. The system also includes a data processing means and a communications bus configured to be coupled to the data processing means. The system further includes an interfacing means, configured to provide at least one of monitoring, control, and communications functions for the circuit breaker and the electronic monitoring unit in communication with the circuit breaker and with the communications bus.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
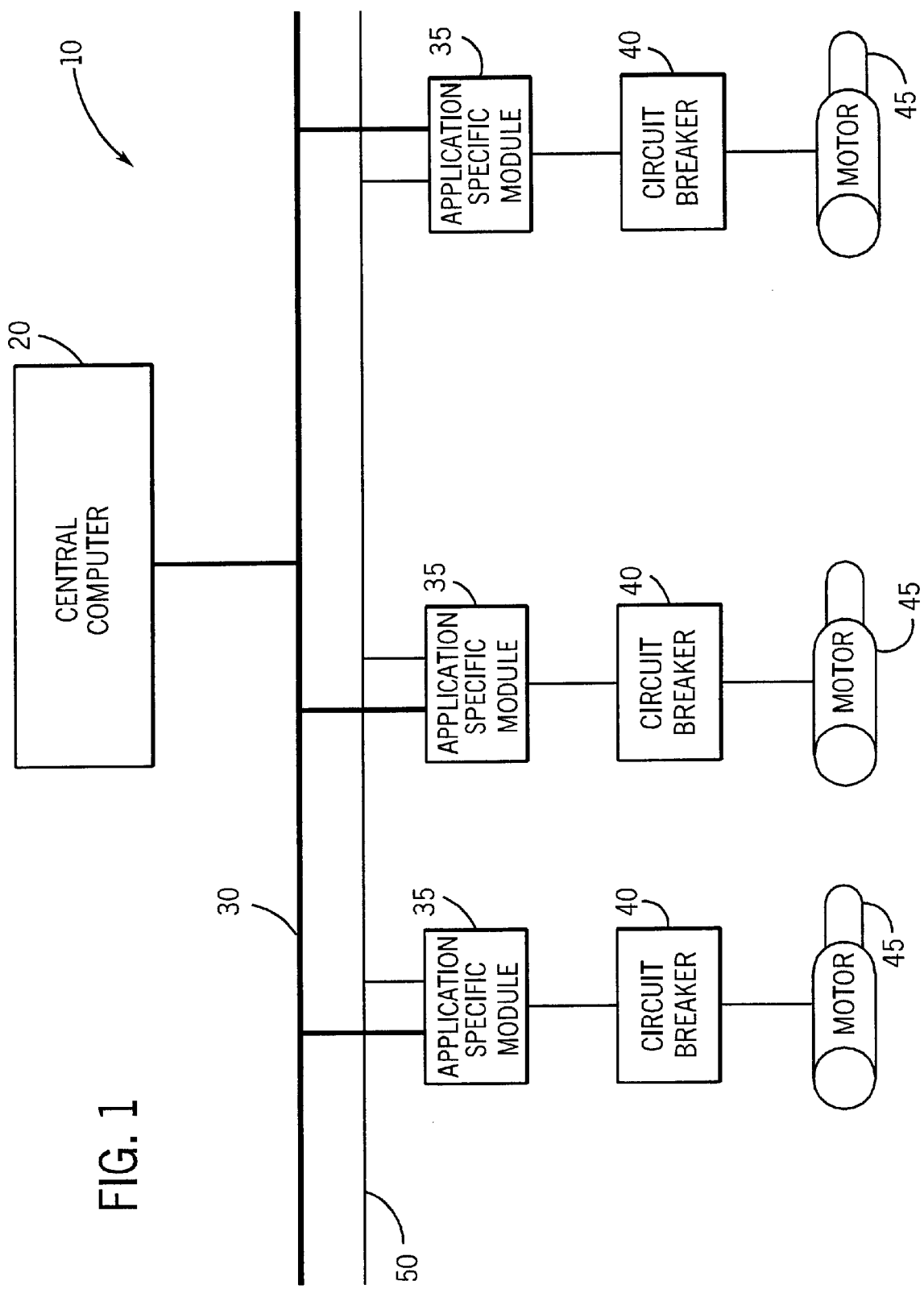
FIG. 1 is a block diagram of a circuit breaker communication, monitoring, and control system.

Referring now to FIG. 1, a block diagram of a preferred embodiment of a circuit breaker communication, monitoring and control system 10 is depicted. System 10 includes a central computer 20 which may be any type of centralized data processing unit including, but not limited to a personal computer, a work station, a computer server, or a dedicated data processing device. Central computer 20 is coupled to a communications bus 30. Communications bus 30 may be any of a wide array of standard communications bus architectures including, but not limited to Ethernet, RS-485, fiber optic architectures, or other applicable bus architectures. Communications bus 30 may use any of a number of applicable communications protocols including, but not limited to profibus, profibus DP, TCP/IP, or any other applicable communications protocol.

Communications bus 30 is coupled to and in communication with a plurality of application specific modules 35 which are interfacing devices between communications bus 30 and a circuit breaker 40. Circuit breaker 40 is coupled to a load such as motors 45. In a preferred embodiment, circuit breaker 40 may be a Molded Case Circuit Breaker (MCCB), but alternatively circuit breaker 40 may be other types of circuit breakers. Circuit breaker 40 may be coupled to any of a variety of load types including, but not limited to, motors 45, welders, computers, heaters, lights, or any other type of electrical equipment.

Circuit breaker 40 is configured to interrupt current flow to motor 45 or any applicable load when any of a variety of overload conditions are detected. Circuit breaker 40 may be tripped either by a short circuit condition, or by electronically sensing an overload condition, the overload condition being preprogrammed into the circuit breaker electronics. Trip types may include, but are not limited to, overload trips, short time trips, ground fault trips, and instantaneous trips.

Figure 2:
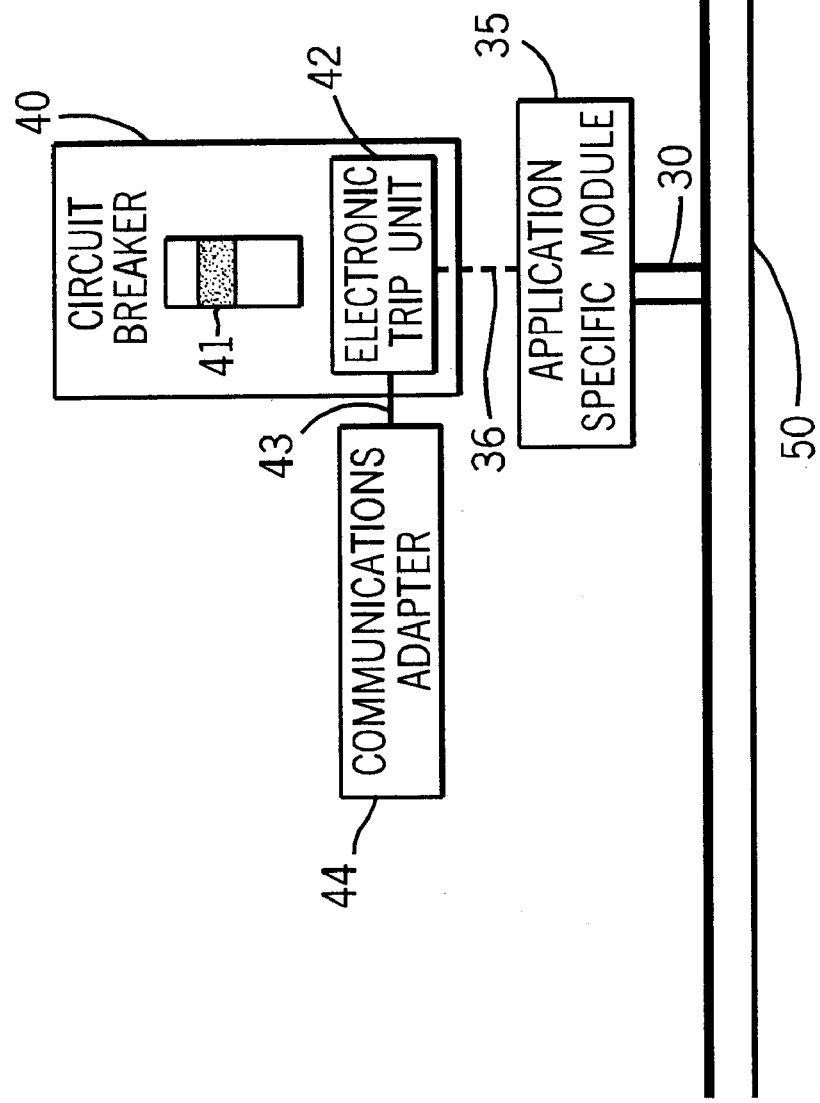
FIG. 2 is a block diagram of a circuit breaker having an application specific module in communication with an external communications bus.

Referring now to FIG. 2, circuit breaker 40 is depicted as having a circuit breaker handle 41 for manual tripping or resetting of circuit breaker 40. Further, circuit breaker 40 has an electronic trip unit 42, which in a preferred embodiment includes a liquid crystal display (LCD) readout or may include any type of display. Electronic trip unit 42 may be programmed to cause current interruption when any of a variety of overload conditions is sensed by the electronic trip unit. For example, electronic trip unit 42 may be programmed to interrupt current when a specified root means square (RMS) current value is reached. Further, other types of overload conditions may be specified.

Figure 3:
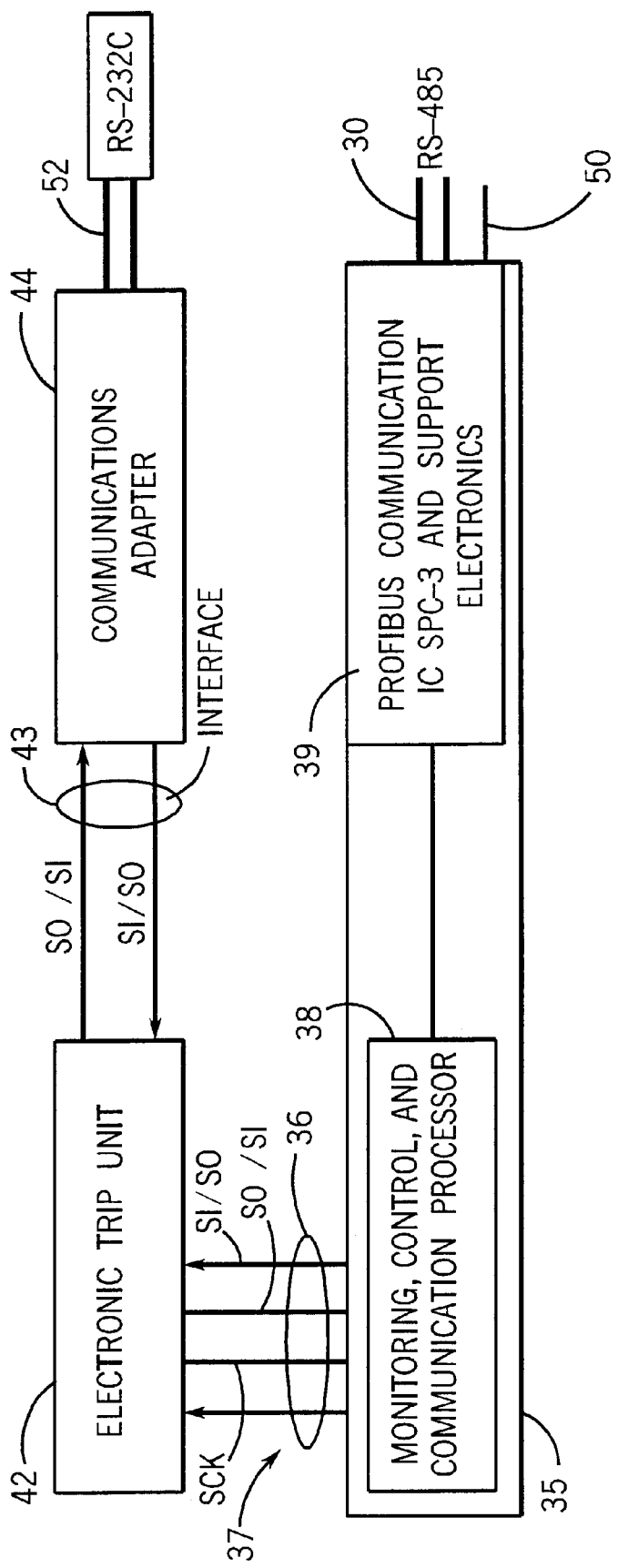
FIG. 3 is a block diagram of the circuit breaker of FIG. 2 showing the communication lines in more detail.

In a preferred embodiment, electronic trip unit 42 includes an interface 43 for a communications adapter 44. Communications adapter 44 may be coupled to a personal computer, or other data processing device or further may be coupled to any of a variety of communications buses or communication devices. Communications adapter 44 allows an attached communications or data processing device to download information from electronic trip unit 42 or alternatively allows communication with electronic trip unit 42 to program electronic trip unit 42 for any of a variety of internal settings. Interface 43 between electronic trip unit 42 and communications adapter 44 may be any of a variety of serial output/serial input (SO/SI), serial input/serial output (SI/SO) communications lines 43, as depicted in FIG. 3. Further, communications adapter 44 preferably uses a serial interface 52, such as serial interface RS-232C as depicted in FIG. 3. Interface 43 and interface 52 are not limited to serial interfaces of the type shown. Interfaces 43 and 52 may be any of a variety of applicable communications interfaces including Ethernet, parallel interfaces, or any other applicable interfaces.

Referring again to FIG. 2, electronic trip unit 42 is coupled to application specific module 35 through a communications line 36. In a preferred embodiment, communications line 36 may be a three meter cable which is a serial communications interface as depicted in FIG. 3. Serial communications interface 36 may include a plurality of communications lines such as serial input/serial output (SI/SO) line, serial output/serial input (SO/SI) line, serial clock (SCK) line and auxiliary power and signals line 37. Auxiliary power and signals line 37 is configured to carry power from ASM 35 to electronic trip unit 42.

As depicted in FIG. 3, serial communication interface 36 is coupled to a monitoring, control, and communication processor 38 of ASM 35. The monitoring, control, and communication processor 38 carries out monitoring, control, and communication functions for ASM 35. The functions include communicating information to and from electronic trip unit 42, transmitting and receiving data from electronic trip unit 42, including information such as, but not limited to, the type of trip encountered, the time of trip, the current values at time of trip, (for example, a trip log). Further, monitoring, control, and communications processor 38 may provide programming information to electronic trip unit 42, such as resetting trip values for electronic trip unit 42 and further may be used to receive real-time data from electronic trip unit 42. Monitoring, control, and communication processor 38 is coupled to a communications module 39 of ASM 35 which may be, in a preferred embodiment, a profibus communications IC SPC-3 communications device and required support electronics.

ASM 35 is coupled to a communications bus 30, such as the RS-485 communications bus depicted in FIG. 3.

To provide functioning of electronic trip unit 42 after a trip or current interruption has occurred, electronic trip unit 42 receives external power through a power line 50 that is coupled to ASM 35. ASM 35 supplies power to electronic trip unit 42 through line 37 depicted in FIG. 3. Power line 50 may also supply zone select interlock signals to ASM 37. Power line 50 further powers ASM 35 (FIG. 2). In a preferred embodiment, ASM 35 is powered by a 24 volt line 50.

A zone selective interlock signal communicated along line 50 allows breakers that are downstream from a particular breaker to be tripped without tripping upstream breakers. This functionality allows an overload condition to be sensed and interrupted without interruption of the entire system. (For example, in an industrial setting it would not be desirable to shut down an entire factory system because a single load device fails thereby tripping a single circuit breaker.)

Circuit breakers of the type commonly associated with circuit breaker 40 are typically low voltage circuit breakers in the range of 600 volts or less, but the communication and control system discussed above may be configured to operate with circuit breakers of any rated voltage. Further, circuit breakers commonly associated with circuit breakers 40 have current ratings from approximately 63 amps up to 1600 amps, however, other rated currents may also be applied. Further, circuit breakers of the type commonly associated with circuit breaker 40 are three phase circuit breakers which may be three pole or two pole circuit breakers however single phase circuit breakers may also be used.

Those who have skill in the art will recognize that the present invention is applicable with many different hardware configurations, software architectures, communications protocols, and organizations or processes.

While the detailed drawings, specific examples, and particular formulations given describe preferred embodiments, they serve the purpose of illustration only. The materials and configurations shown and described may differ depending on the chosen performance characteristics and physical characteristics of the communication network. For example, the type of communication network or communication protocols used may differ. The systems shown and described are not limited to the precise details and conditions disclosed. Furthermore, other substitutions, modifications, changes, and omissions may be made in the design, operating conditions, and arrangement of the preferred embodiments without departing from the spirit of the invention as expressed in the appended claims.

What is claimed is:

1. An information system, comprising:
    a circuit breaker connectable to a load and having a current interrupting portion;
    a data processing unit;
    a communications bus using a profibus communication protocol and configured to be coupled to the data processing unit; and
    an electronic monitoring unit, configured to provide at least one of monitoring, control, and communications functions for the circuit breaker, the electronic monitoring unit in communication with the circuit breaker and with the communications bus.

2. The information system of claim 1 further comprising:
    a communication interface coupled to the circuit breaker.

3. The information system of claim 2 further comprising:
    a data processing unit coupled to the communication interface.

4. The information system of claim 1 further comprising:
    a power input coupled to the electronic monitoring unit and capable of supplying power to the circuit breaker.

5. The information system of claim 1 wherein the data processing unit provides at least one of monitoring, control, and communications functions for a plurality of circuit breakers.

6. The information system of claim 1 wherein the electronic monitoring unit is coupled to a zone selective interlock system.

7. A circuit breaker communications, monitoring, and control system, comprising:
    a central data processing unit;
    a communications bus using a profibus communication protocol and coupled to the central data processing unit;
    an application specific module coupled to the communications bus; and
    a circuit breaker connectable to a load and having a current interrupting portion, and the circuit breaker coupled to the application specific module and communicating electronic signals with the application specific module.

8. The circuit breaker communications, monitoring, and control system of claim 7 further comprising:
    a communication interface coupled to the circuit breaker.

9. The circuit breaker communications, monitoring, and control system of claim 8 further comprising:
    a data processing unit coupled to the communication interface.

10. The circuit breaker communications, monitoring, and control system of claim 7 further comprising:
    a power input coupled to the application specific module and capable of supplying power to the circuit breaker.

11. The circuit breaker communications, monitoring, and control system of claim 7 wherein the application specific module provides power to the circuit breaker when the circuit breaker is tripped.

12. The circuit breaker communications, monitoring, and control system of claim 7 wherein the central data processing unit provides at least one of monitoring, control, and communications functions for a plurality of circuit breakers.

13. The circuit breaker communications, monitoring, and control system of claim 7 wherein the application specific module communicates a type of fault to the central data processing unit when the circuit breaker is tripped.

14. The circuit breaker communications, monitoring, and control system of claim 7 wherein the application specific module communicates current data to the central data processing unit.

15. The circuit breaker communications, monitoring, and control system of claim 7 wherein the application specific module communicates a circuit breaker trip log to the central data processing unit.

16. A circuit breaker system configured for use in a commercial environment, comprising:
 a circuit breaker connectable to a load and having a current interrupting portion;
 a data processing means;
 a communications bus using a profibus communication protocol and configured to be coupled to the data processing means; and
 a means for providing at least one of monitoring, control, and communications functions for the circuit breaker and an electronic monitoring unit in communication with the circuit breaker and with the communications bus.

17. The circuit breaker system of claim 16 wherein the interfacing means is coupled to a zone selective interlock system.

18. The circuit breaker system of claim 16 further comprising:
 a power input coupled to the providing means and capable of supplying power to the circuit breaker.

19. The circuit breaker system of claim 16 further comprising:
 a communications adapter coupled to the circuit breaker.

20. The circuit breaker system of claim 16 further comprising:
 a microprocessor device coupled to the communications adapter.

21. The circuit breaker system of claim 16 wherein the data processing means provides at least one of monitoring, control, and communications functions for a plurality of circuit breakers.

* * * * *

UNITED STATES PATENT AND TRADEMARK OFFICE
CERTIFICATE OF CORRECTION

PATENT NO. : 6,356,422
DATED : March 12, 2002
INVENTOR(S) : Bilac et al.

It is certified that error appears in the above-identified patent and that said Letters Patent is hereby corrected as shown below:

<u>Column 6,</u>
Line 18, please delete "and_configured" and replace it with -- and configured --.

Signed and Sealed this

Twenty-first Day of May, 2002

Attest:

JAMES E. ROGAN
*Attesting Officer*     *Director of the United States Patent and Trademark Office*